United States Patent

Komurasaki et al.

[11] 4,351,307
[45] Sep. 28, 1982

[54] IGNITION TIMING CONTROLLER FOR AN INTERNAL COMBUSTION ENGINE

[75] Inventors: Satoshi Komurasaki; Atsushi Ueda, both of Himeji, Japan

[73] Assignee: Mitsubishi Denki Kabushiki Kaisha, Tokyo, Japan

[21] Appl. No.: 181,395

[22] Filed: Aug. 22, 1980

[30] Foreign Application Priority Data

Aug. 22, 1979 [JP] Japan .................... 54-107433

[51] Int. Cl.$^3$ ................................................ F02P 5/04
[52] U.S. Cl. ............................... 123/618; 123/612; 123/416
[58] Field of Search ................ 123/612, 618, 417, 416

[56] References Cited

U.S. PATENT DOCUMENTS

| | | | |
|---|---|---|---|
| 3,991,733 | 11/1976 | Harris | 123/618 |
| 4,232,368 | 11/1980 | Hill | 123/416 |
| 4,262,526 | 4/1981 | Makita | 123/416 |
| 4,317,437 | 3/1982 | Lindgren | 123/416 |

*Primary Examiner*—Ronald B. Cox
*Attorney, Agent, or Firm*—Wenderoth, Lind & Ponack

[57] ABSTRACT

An ignition timing controller for an internal combustion engine which is capable of automatically correcting the deviation of the ignition timing from the normal positions thereof in the cycle of the internal combustion engine is disclosed. Preliminary timing signals which are advanced by an angle in the cycle of the engine in proportion to the rotational speed of the engine are generated by a preliminary timing signal generator. The ignition timing signals are produced in said ignition timing controller by retarding said preliminary timing signals by a phase shifter in said controller. The advance angle by which the ignition timing signals are advanced with respect to reference timing signals which are generated for a reference purpose at fixed rotational angles in the cycle of the engine is detected, and the sum of said advance angle and the angle by which the preliminary timing signal is retarded by the phase shifter is memorized as a control signal by a memory during the idling state of the engine. The retarded angle by which the preliminary timing signals are retarded in the cycle of the engine is controlled by the memorized correction signal, so that the retarded preliminary timing signals, namely the ignition timing signals, and the reference timing signals coincide in the rotational angles thereof in the cycle of the engine while the engine is in the idling state.

4 Claims, 6 Drawing Figures

FIG. 4
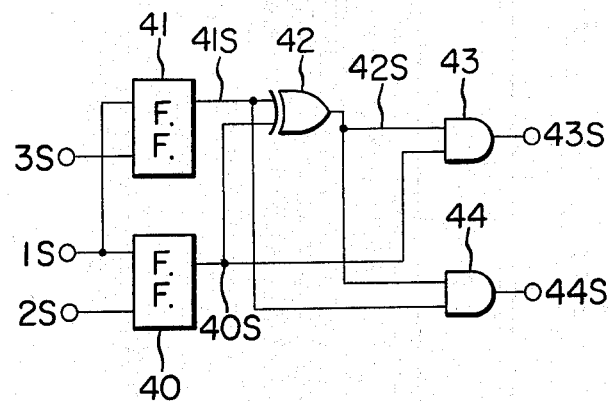
FIG. 5
FIG. 6
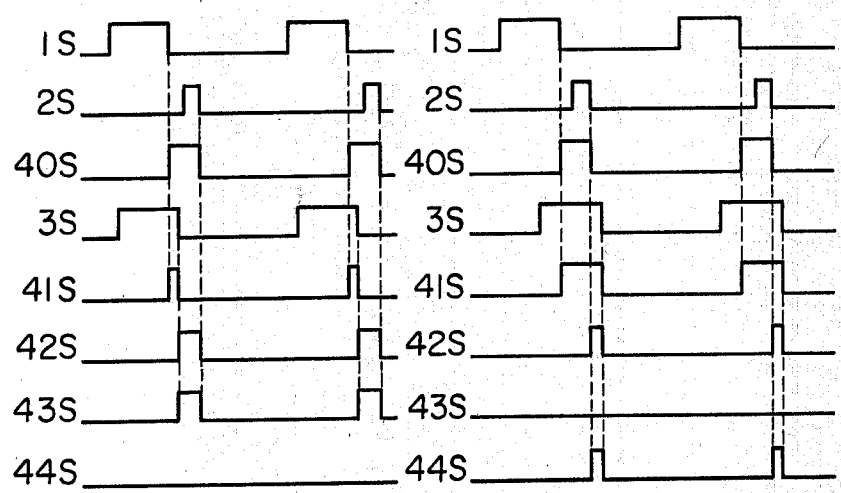

IGNITION TIMING CONTROLLER FOR AN INTERNAL COMBUSTION ENGINE

BACKGROUND OF THE INVENTION

This invention relates to ignition timing controllers for an internal combustion engine.

In recent years there has been a strong demand for ignition systems which are more precise and stable in ignition timing than has hitherto been realized, so that the exhaust gas of the internal combustion engines can be made cleaner and the output power of the internal combustion engines can be further increased. For this reason conventional contact breaker type ignition systems are being replaced by the fully electronic or transistorized systems which do not use contact breakers.

Although in these electronic ignition systems the ignition timing signals are produced by an ignition timing signal generator which does not utilise breaker contacts (namely, by signal generators such as those utilizing magnetic inductive coils or Hall-effect devices), the timing signal generator is included in the distributor which is driven mechanically by the crankshaft of the internal combustion engine, for example through a timing belt, as was also the case with conventional contact breaker type ignition systems.

Therefore, deviation of the ignition timing signals from the normal positions thereof in a cycle of the internal combustion engine such as may occur due to various causes would increase and become more apparent as time goes by, due, for example, to the aging of the distributor drive mechanism. This deviation of the ignition timing signals from the normal positions thereof, which is also conspicuous in the idling state of the internal combustion engine, greatly and adversely affects the composition of the exhaust gas and the output power of the internal combustion engines.

In conventional ignition systems as hereinabove described, the deviation of the ignition timing from the normal positions thereof in the cycle of the internal combustion engine due to manufacturing errors within a permitted tolerance for the distributor and the internal combustion engine, is corrected by initial adjustment of the rotational angle of the distributor with respect to the driving shaft thereof which is driven by the crankshaft of the internal combustion engine. For this reason, the portion of the distributor which is mounted to the driving shaft thereof has a structure capable of rotation for adjustment purposes. This structure is convenient for periodical adjustments of the internal combustion engine which should be carried out at regular time intervals. But this structure also allows a person having certain knowledge in the art to deliberately advance the ignition timings from the normal positions thereof in the cycle of the internal combustion engine, so that the output power of the internal combustion engine can be increased. But this deliberate misadjustment adversely affects the the composition of the exhaust gas of the internal combustion engine.

Thus the conventional ignition systems have suffered from deviations of the ignition timings from the normal positions thereof in the cycle of the internal combustion engine, due to various causes, as hereinabove described so that the composition of the exhaust gas of the internal combustion engine is adversly affected by said deviations.

SUMMARY OF THE INVENTION

Therefore an object of the present invention is to provide an ignition timing signal generator or an ignition timing controller which is capable of automatically correcting the deviations of the ignition timing from the normal positions thereof in the cycle of the internal combustion engine.

The present invention provides an ignition timing controller comprising a reference timing signal generator and an preliminary timing signal generator. The reference timing signal generator generates reference timing signals at fixed rotional angles in the cycle of the associated internal combustion engine, detecting, for example, the rotational angle of the crankshaft of the internal combustion engine. The preliminary timing signal generator generates preliminary timing signals at advanced rotational angles in the cycle of the internal combustion engine which are advanced by a fixed predetermined angle with respect to said fixed rotational angles when said internal combustion engine is in the idling state. The initial value of the fixed predetermined angle is selected to be greater in magnitude than the expected angular deviation of said preliminary timing signals from the normal positions thereof. Said preliminary signals are further advanced in the cycle of the internal combustion engine as the rotational speed of the engine increases.

A phase shifter retards the preliminary timing signals in the cycle of the engine by a certain controlled rotational angle or phase angle so that the retarded preliminary timing signals and the reference timing signals coincide when the engine is in the idling state. The retarded preliminary timing signals serve as the ignition timing signals.

The advance angle by which the retarded preliminary timing signals, namely the ignition timing signals are advanced with respect to the reference timing signals is detected by an angular difference detector and a control signal which is proportional in magnitude to the sum of said controlled rotational angle and said advance angular is generated by a control signal generator. The control signal is memorized when the engine is in the idling stage, and the memorized control signal is applied to the phase shifter to control said controlled rotational angle by which the preliminary timing signals are retarded by said phase shifter.

BRIEF DESCRIPTION OF THE DRAWINGS

Further advantages and the principle of the present invention will become more apparent from the following detailed description of the preferred embodiments of the present invention made in conjunction with the drawings, in which:

FIG. 4 is a circuit diagram of an angular difference detector of the ignition timing controller of FIG. 3, showing the implementation thereof;

FIG. 5 is a diagram of the waveforms associated with the circuit of FIG. 4, where in the ignition timing signals are advanced with respect to the normal positions thereof in the cycle of the internal combustion engine associated with the ignition timing controller of FIG. 3; and FIG. 6 is a similar diagram to that of FIG. 5, but shows the case where the ignition timing signals are retarded with respect to the normal positions thereof in the cycle of the internal combustion engine.

DESCRIPTION OF THE PREFERRED EMBODIMENT

Figure 1:
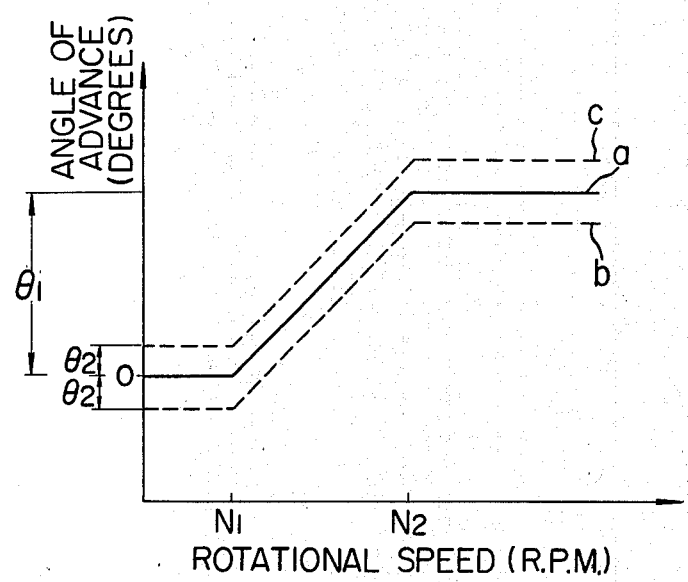
FIG. 1 is a diagram showing normal and deviant advance angle to rotational speed characteristics of a centrifugal advance mechanism, to explain the operation of such a mechanism.

Referring now to FIG. 1, the deviation of the ignition timing signals from the normal positions thereof in the cycle of the associated internal combustion engine which may occur in conventional ignition systems is explained. Solid curve a shows the normal advance angle to rotational speed characteristics of a centrifugal advance mechanism. Dotted curve b shows deviant characteristics thereof, which are retarded by an angle $\theta_2$ from the normal characteristics a due to aging of the system comprising the ignition system and the internal combustion engine. Similarly the dotted curve c shows another deviant characteristics curve of a centrifugal advance mechanism which is advanced by the angle $\theta_2$ from the normal characteristic a. As the deviation of the ignition timing signals generated by a centrifugal advance mechanism is negligible when the ignition system and the internal combustion engine are new, the ignition timing coincides with the reference timing, that is to say, the advance angle is substantially equal to zero when the associated engine is rotating at $N_1$ rotations per minute, or is in the idling state, as shown by the curve a. As the rotational speed of the engine increases from $N_1$ rotations per minute to $N_2$ rotations per minute, the ignition timing is advanced in proportion to the increase of the rotational speed, reaches the maximum advance angle or full advance angle $\theta_1$ at $N_2$ rotations per minute, and retains the full advance angle $\theta_1$ until the maximum rotational speed is reached.

As the ignition system and the associated internal combustion engine age, however, the ignition timing may be retarded from the normal timing thereof due to the aging, as shown by the curve b. The ignition timing may be advanced from the normal timing thereof due to various previously discussed causes, as shown by the curve c. These deviations Referring now to FIG. 2, the principle of the present invention is described. A curve d shows the advance angle to rotational speed characteristics of preliminary timing signals generated by the centrifugal advance mechanism included in the distributor for the associated internal combustion engine. According to the present invention, as shown by the curve d, the advance angle to rotational speed characteristics of the preliminary timing signals are advanced by a rotational angle or a phase angle $\theta_3$ from the normal advance angle to rotational speed characteristics of the ignition timing signals which is shown by a curve f. The initial value of the rotational angle $\theta_3$ is selected to be greater in magnitude than the expected deviation of the preliminary timing signals, due, for example, to manufacturing errors within the permitted tolerances of the associated engine and distributor, and/or to the aging of the ignition system and the engine. These preliminary timing signals advanced by the angle $\theta_3$ from the normal characteristic f of the ignition timing signals for the internal combustion engine is then retarded by a controlled angle by a phase shifter, so that the characteristics of the retarded preliminary timing signals coincide with the normal characteristics f of the ignition timing signals. The angular difference between the retarded preliminary timing signals, namely the ignition timing signals, and the reference timing signals which are generated at fixed rotational angles which coincide with the normal positions of the ignition timing signals when the engine is in the idling state, is detected and the sum of said difference and the angle by which said preliminary timing signals are retarded is memorized as the control signal when the engine is in the idling state. The angle by which said preliminary timing signals are retarded by the phase shifter is controlled by said control signal, so that the characteristics of the retarded preliminary timing signals, namely the ignition timing signals, always coincides with the normal characteristics f of the ignition timing.

Figure 3:
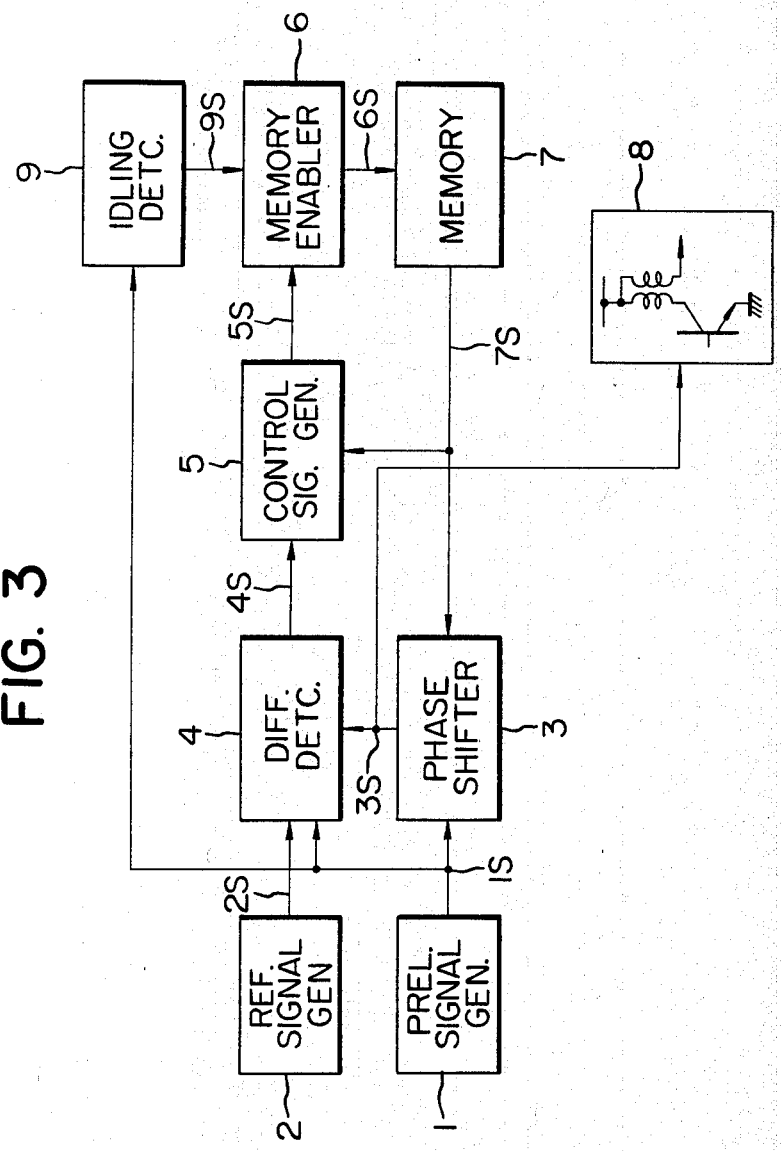
FIG. 3 is a block diagram of an ignition timing controller according to the present invention.

Referring now to FIG. 3, an embodiment of the present invention is described.

Figure 2:
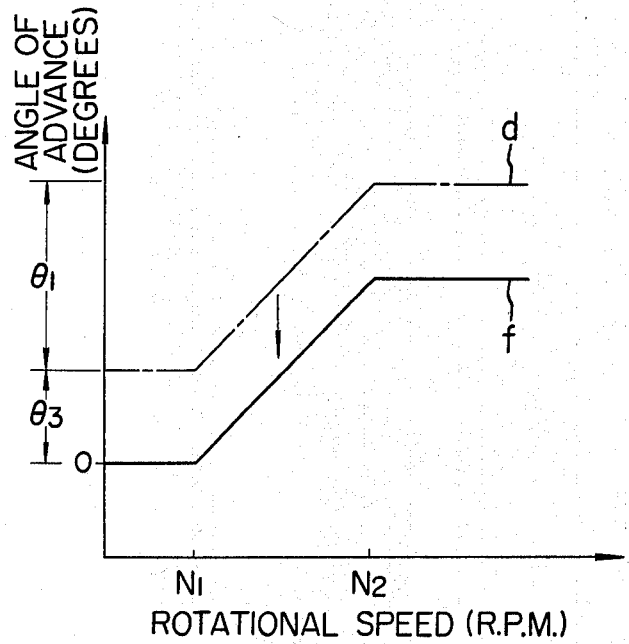
FIG. 2 is a diagram showing the advance angle to rotational speed characteristics of preliminary timing signals generated by a centrifugal advance mechanism associated with the present invention, together with the similar characteristics of retarded preliminary timing signals, namely the ignition timing signals.

A preliminary ignition timing signal generator 1 which may be a conventional centrifugal advance mechanism disposed in the distributor and generates preliminary ignition timing signals 1S which are advanced depending on certain parameters of the associated internal combustion engine which are indicative of the operating state of the engine, for example, the rotational speed thereof, as shown by the curve d of FIG. 2. A reference signal generator 2 which may be of a conventional type rotational speed detector generating electrical pulses disposed at the crankshaft of the engine and which detects the reference angles thereof generates reference timing signals 2S at fixed rotational angles in the cycle of the engine. A phase shifter 3, which may be of a conventional type known in the art, retards the preliminary ignition timing signals 1S generated by the preliminary timing signal generator 1 by a controlled rotational angle or phase angle which corresponds in magnitude to a control signal 7S applied to the phase shifter 3 from a memory 7, thus generating a retarded preliminary timing signal, or ignition timing signal 3S. An angular difference detector 4 detects the advance angle or correction angle by which the retarded preliminary timing signals 3S are advanced with respect to the reference timing signals 2S and thus generates a correction angle signal 4S. The advance angle detected by the angular difference detector 4 corresponds to the correction angle by which the retarded preliminary timing signals 3S must be further retarded in order that the retarded preliminary timing signals 3S will coincide with reference timing signals 2S when the engine is in the idling state. A control signal generator 5 generates a control signal 5S which is proportional in magnitude to the sum of the advance angle detected by the angular difference detector 4 and the controlled angle by which the preliminary timing signals 1s are retarded by the phase shifter 3. An idling detector 9, which may comprise a pulse counter, connected to the preliminary timing signal generator 1 detects the idling state of the engine by detecting the rotational speed of the engine, and the memory enabler 6 enables the memory 7 and inputs the control signal 6S to the memory 7, responding to the output of the idling detector 9. The memory 7 outputs the memorized control signal 7S over the whole range of the rotational speed of the associated engine, and the controlled angle by which the phase shifter 3 retards the preliminary timing signals 1s is controlled by the memorized control signal 7S. To explain in more detail, the advance angle or correction angle by which the retarded preliminary timing signals 3S are advanced with respect to the reference timing signals 2S is detected by the angular difference detector 4, and the control signal 7S is corrected by the control signal generator 5 to be increased (that is to say to be increased when the advance angle detected by the angular difference detector 4 is positive and to be decreased when the advance angle is negative) by the advance angle or correction angle. The corrected control signal or the new control signal 5S is generated by the control signal generator 5 and memorized by the memory 7 when the engine is in the idling state. The controlled angle by which the preliminary timing signals 1S are retarded by the phase shifter 3 is controlled by this memorized control signal 7S applied to the phase shifter 3 from the memory 7. The retarded preliminary timing signals or ignition timing signals 3S operate the switching circuit of the ignition voltage generator 8 to generate the ignition voltage for the associated internal combustion engine.

Now the operation of the embodiment of FIG. 3 is described.

The preliminary ignition timing signals 1S have advance angle to rotational speed characteristics as shown by the curve d of FIG. 2.

The preliminary timing signals 1S are retarded by a controlled angle which is controlled by the memorized control signal 7S applied to said phase shifter 3 from the memory 7, and the retarded preliminary ignition timing signals, namely the ignition timing signals 3S drive or operate the ignition voltage generator 8 so that the ignition voltage is generated for the associated engine. The ignition timing signals 3S are also inputted to the angular difference detector 4.

The reference timing signal generator 2, on the other hand, generates the reference timing signals 2S at fixed rotational angles (advance angle zero) which do not depend on the rotational speed of the engine.

The angle by which the ignition timing signals 3S are advanced with respect to the reference timing signals 2S is detected by the angular difference detector 4, and the angular difference detector 4 generates the correction angle signal 4S corresponding to the detected advance angle, in the form of, for example, a pair of pulse trains having a width corresponding to the detected advance angle or correction angle, the pair of pulse trains corresponding to the positive and negative values of said detected advance angle respectively. When the detected advance angle or correction angle is positive, the controlled angle by which the preliminary timing signals 1S are retarded by the phase shifter 4 is to be increased by the advance angle, and when it is negative the controlled angle is to be decreased by the detected advance angle (that is to say, by the absolute value of the advance angle). The control signal generator 5 generates the control signal 5S which is proportional in magnitude to the algebraic sum of the detected advance angle and the controlled angle, the value of which may be known from the memorized control signal 7S which may be applied to the control signal generator 5. To avoid the undesirable hunting of the value of the control signals 5S and 7S, or the value of the controlled angle by which the preliminary timing signals 1S are retarded by the phase shifter 3, the control signal generator 5 has a locking or holding function to hold the value of the control signal 5S at a constant level when the value of the detected advance angle or the correction angle which is indicated by the correction angle signal 4S generated by said angular difference detector 4 remains smaller than a predetermined permitted level.

The idling detector 9 detects the idling state of the associated engine from the preliminary timing signals 1S which are applied thereto from the preliminary timing signal generator 1S, and inputs the idling signal 9S to the memory enabler 6. Responding to said idling signal 9S from the idling detector 9 the memory enabler 6 enables the memory 7 and inputs the control signal 5S generated by the control signal generator 5 when the engine is in the idling state.

The memorized control signal 7S applied to the phase shifter 3 controls the controlled angle by which the preliminary timing signals 1S are retarded by the phase shifter 3, so that the angular difference between the retarded preliminary timing signals, namely the ignition timing signals, 3S and the reference timing signals 2S is made smaller when the engine is in the idling state. Thus the controlled angle by which the preliminary timing signals 1S are retarded by said phase shifter 3 is controlled by the feed-back closed loop control, detecting the angular difference between the retarded preliminary timing signals namely the ignition timing signals 3S and the reference timing signals 2S, and rotational angles or phase angles at which the ignition timing signals 3S are generated is corrected to the reference angles (advance angle zero) when the engine is in the idling state. Because the memory 7 stores the control signal 5S and the controlled angle is controlled by the memorized control signal 7S, the advance angle to rotational speed characteristics of the ignition timing signals 3S is corrected to the normal characteristics thereof as shown by the curve f of FIG. 2 over the whole range of the rotational speed of the associated internal combustion engine. Therefore the ignition voltage which is generated by the ignition voltage generator 8, responsive to the ignition timing signals 3S, is generated at the ignition timing which also conforms to the normal advance angle to rotational speed characteristics as shown by the curve f of FIG. 2.

Referring now to FIG. 4, an implementation of the angular difference detector 4 of the embodiment of FIG. 3 is described.

A first flip-flop 40 is set and reset by the preliminary timing signals 1S and the reference timing signals 2S generated by the preliminary timing signal generator 1 and the reference timing signal generator 2 respectively. A second flip-flop 41 is set and reset by the preliminary timing signals 1S and the retarded preliminary timing signals or the ignition timing signals 3S respectively, the retarded preliminary timing signals 3S being generated by the phase shifter 3. The two inputs of the exclusive OR gate 42 is connected to the outputs 40S and 41S of the flip-flops 40 and 41, and the two inputs of the first AND gate 43 are connected to the outputs 42S and 40S of the exclusive OR gate 42 and the first flip-flop 40. The two inputs of a second AND gate 44 are connected to the outputs 42S and 41S of the exclusive OR gate 42 and the second flip-flop 41.

Referring now to FIGS. 5 and 6, the operation of the angular difference detector 4 of FIG. 4 is now described.

The first flip-flop 40 is set and reset by the trailing edges of the preliminary timing signals 1S and the reference timing signals 2S, and generates the pulse signals 40S having a pulse width corresponding to the angular difference between the preliminary timing signals 1S and the reference timing signals 2S. The second flip-flop 41 is set and reset by the trailing edges of the preliminary timing signals 1S and the ignition timing signals 3S generated by the phase shifter 3, and generates the pulse signals 41S having a pulse width corresponding to the controlled angle by which said preliminary timing signals are retarded by the phase shifter 3. When the closed loop control effected by the ignition timing controller of FIG. 3 is sufficient, the pulse width of the pulse signals 41S comes to be substantially equal to that of the pulse signals 40S.

In the case where the advance angle or the correction angle by which the retarded preliminary timing signals or the ignition timing signals 3S are advanced with respect to said reference timing signals 2S is positive, that is to say the ignition timing signals 3S are advanced with respect to the reference timing signals 2S, the exclusive OR gate 42 which operates an exclusive OR operation on the pulse signals 40S and 41S generates the pulse signals 42S which have a pulse width ranging from a trailing edge of the pulse signals 41S to a trailing edge of the pulse signals 40S, as is shown in FIG. 5. In the case where the advance angle is negative, that is to say, the ignition timing signals 3S are retarded with respect to the reference timing signals 2S, the pulse signals 42S generated by the exclusive OR gate 42 have a pulse width ranging from a trailing edge of the pulse signals 40S to a trailing edge of the pulse signals 41S, as is shown in FIG. 6.

The pulse signals 42S generated by the exclusive OR gate 42 have a pulse width equal to the absolute value of the advance angle or the correction angle by which the ignition timing signals 3S are advanced with respect to the reference timing signals 2S.

The logical products of the pulse signals 42S and 40S, and 42S and 41S are produced in the AND gates 43 and 44 respectively. Thus, in the case where the ignition timing signals 3S are advanced with respect to the reference timing signals 2S, the pulse signals 43S are identical to the pulse signals 42S, while the pulse signals 44S are continually zero, as is shown in FIG. 5. On the other hand, when the ignition timing signals 3S are retarded with respect to the reference timing signals 2S, the pulse signals 44S are identical to the pulse signals 42S, while the pulse signals 43S generated by the AND gate 43 are continually zero. Thus, corresponding to the two cases where the advance angle by which the ignition timing signals 3S are advanced with respect to the reference timing signals 2S is positive or negative, independent output 43S or 44S is generated which has a pulse width corresponding to the absolute value of the advance angle.

The control signal generator 5 and the memory 7 of FIG. 3 may be implemented in a variety of ways. For example the control signal generator 5 may comprise a digital counter and the memory 7 may comprise a digital memory. Or, on the other hand, the control signal generator 5 and the memory 7 may be constituted as a single integral unit comprising a potentiometer generating the control signal and driven by a servomotor which is driven by the correction angle signal 4S generated by the angular difference detector 4. In this case the servomotor and the potentiometer are driven only when the idling detector 9 detects the idling state of the associated engine, the potentiometer being kept at a constant position thereof when the engine is not in the idling state.

What is claimed is:

1. An ignition timing controller for an internal combustion engine comprising, in combination:

means for generating reference timing signals at fixed rotational angles in a cycle of said internal combustion engine, means for generating preliminary timing signals at advanced rotational angles in the cycle of said internal combustion engine which are advanced by a fixed predetermined angle with respect to said fixed rotational angles when said internal combustion engine is in a predetermined operational state and which are further advanced depending on an operating parameter of said internal combustion engine, which is indicative of a operational state of said internal combustion engine, initial value of said fixed predetermined angle being greater in magnitude than a variation of said advanced rotational angles due to accidental causes including aging of a system including said ignition timing controller and said internal combustion engine, means for retarding said preliminary timing signals by a controlled angle in the cycle of said internal cobustion engine, said retarded preliminary timing signals being applied to an ignition voltage generator of said internal combustion engine, thereby causing ignition voltage for said internal combustion engine to be generated, means for detecting an advance angle by which said retarded preliminary timing signals are advanced with respect to said reference timing signals in the cycle of said internal combustion engine, means for generating a control signal which is proportional in magnitude to an algebraic sum of said controlled angle and said advance angle, memory means, and means for causing said control signal to be memorized in said memory means when said internal combustion engine is in said predetermined state, said memory means applying said memorized control signal to said retarding means, thereby controlling said controlled angle so that said advance angle by which said preliminary advanced timing signals are advanced with respect to said reference timing signals become substantially zero, when said internal combustion engine is in said predetermined state.

2. A controller as claimed in claim 1, wherein said predetermined state of said internal combustion engine is an idling state of said internal combustion engine.

3. A controller as claimed in claim 2, wherein said memory causing means comprises:

means for detecting the idling state of said internal combustion engine, and means for enabling said memory means so that said control signal applied to said memory means is caused to be memorized in said memory means, responsive to an output of said idling state detecting means applied to said enabling means indicating the idling state of said internal combustion engine.

4. A controller as claimed in any one of claims 1 to 3, wherein said angular difference detecting means comprises a circuit comprising:

a first flip-flop, two input terminals of which are connected to output terminals of said preliminary timing signal generating means and said reference timing signal generating means, and which is set and reset by said preliminary timing signals and reference timing signals applied thereto, a second flip-flop, two input terminals of which are connected to output terminals of said preliminary timing signal generating means and said retarding means, and which is set and reset by said preliminary timing signals and said retarded preliminary timing signals, an exclusive OR gate, two inputs of which are connected to outputs of said first and second flip-flops, a first AND gate, two inputs of which are connected to an output of said exclusive OR gate and said first flip-flop respectively, and a second AND gate, two inputs of which are connected to the output terminal of said exclusive OR gate and said second flip-flop respectively, outputs of said first and second AND gates together indicating said angular difference between said retarded preliminary timing signals and reference timing signals.

* * * * *